3,145,808
ANCHOR PIN AND WHEEL CYLINDER ASSEMBLY FOR BRAKES

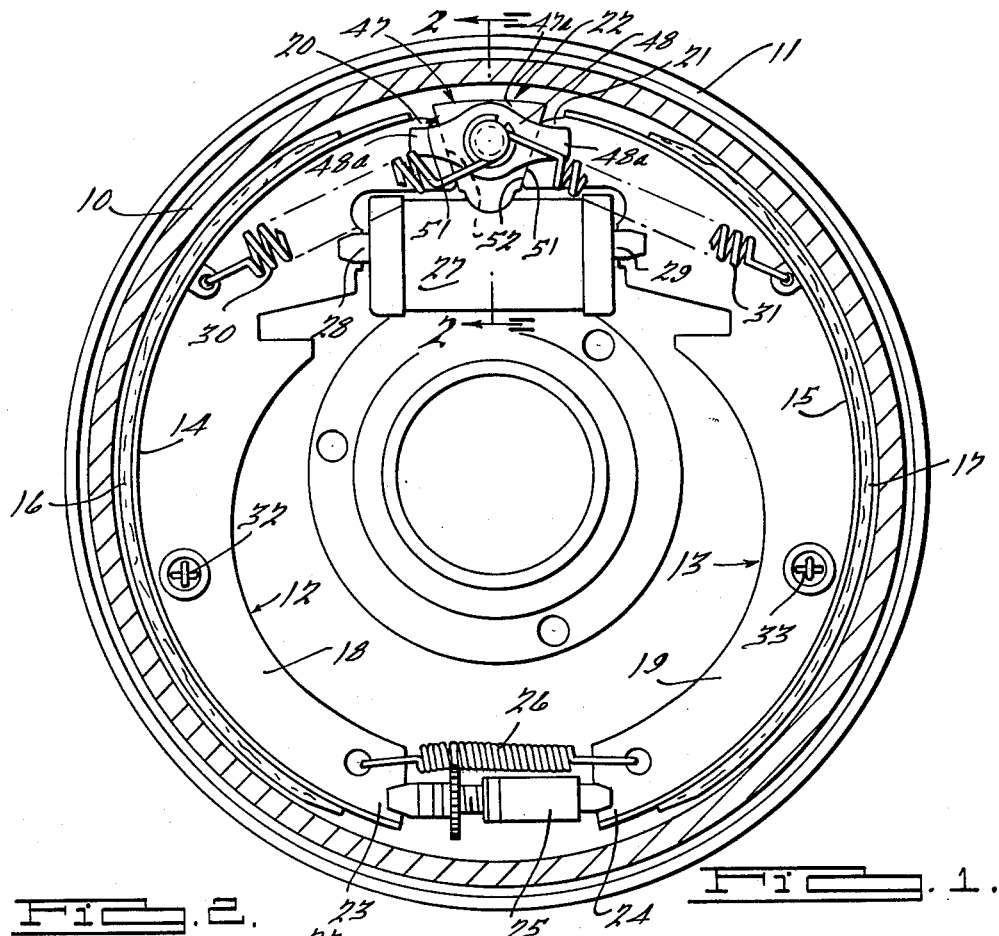
Aug. 25, 1964     H. C. SWIFT     3,145,808
ANCHOR PIN AND WHEEL CYLINDER ASSEMBLY FOR BRAKES
Filed May 23, 1962
INVENTOR.
Harvey C. Swift

Harvey C. Swift, Birmingham, Mich., assignor to Kelsey-Hayes Company, Romulus, Mich., a corporation of Delaware
Filed May 23, 1962, Ser. No. 197,003
4 Claims. (Cl. 188—78)

This invention relates to vehicle brakes and particularly to hydraulic drum type brakes that comprise an annular brake drum, arcuate brake shoes, a stationary backing plate upon which the brake shoes are supported, a hydraulic wheel cylinder for moving the brake shoes into engagement with the brake drum, and an anchor pin for the movable ends of the brake shoes.

Heretofore, the hydraulic brake or wheel cylinder and the anchor pin have been independent of one another and separately mounted on the backing plate. This necessitated the formation of at least two apertures in the backing plate, one of which was frequently large enough to receive a port carrying boss on the back of the wheel cylinder. Such constructions required cap screws, lock washers and other attaching elements for each part. Frequently, the backing plate was also apertured for the passage of the hydraulic fluid conduit therethrough.

With these prior art constructions, the necessary apertures in the backing plate permitted the entrance of dirt and other foreign material into the interior of the brake. Also, the formation and accurate spacing of the apertures presented a problem. Moreover, such prior constructions were costly and required time and skill to assemble.

It is therefore an object of this invention to provide a unitary mounting for the wheel cylinder and anchor pin whereby the construction and assembly of these parts is greatly simplified.

Another object of this invention is to provide a device of this type in which the anchor pin constitutes part of the hydraulic fluid conduit system and also provides means for mounting the wheel cylinder so that but one aperture is required in the backing plate.

Still another object of this invention is to provide a mounting connection between the wheel cylinder and anchor pin which comprises a boss or collar on the wheel cylinder surrounding the anchor pin and sealing rings between these parts which also provide a cushion which eliminates or minimizes the noise resulting from the engagement of the ends of the brake shoes with the anchor pin, commonly called shoe slap noise.

A further object of this invention is to provide a construction of this type in which the wheel cylinder mounting boss or collar is trapezoidal or wedge shaped providing an anchor plate portion having a pair of oppositely inclined surfaces adapted for abutting and sliding engagement with the ends of the brake shoes.

A still further object of this invention is to provide a construction of this type in which the anchor pin has a fluid passage therethrough and extends through the backing plate and is adapted for connection at one end to the hydraulic fluid conduit and at its other end to the wheel cylinder, whereby the anchor pin serves the dual purpose of supporting the wheel or brake cylinder and supplying brake actuating fluid thereto.

Further objects of this invention are to provide a device of this type which is efficient, durable, compact, and of simple construction, comprising a minimum number of parts, whereby it may be economically manufactured and assembled with facility.

The various objects and advantages and the novel details of construction of the invention will become more apparent as this description proceeds, especially when considered in connection with the accompanying drawings, in which:

FIGURE 1 is a sectional elevational view of a brake embodying this invention.

FIGURE 2 is an enlarged sectional view taken substantially on the plane indicated by line 2—2 in FIGURE 1, including the backing plate but omitting the brake drum and brake shoes; and FIGURE 3 is a detail sectional view taken substantially on the plane indicated by line 3—3 in FIGURE 2.

The illustrative embodiment of the invention is shown in the drawings as applied to a brake structure of the internal expanding type comprising arcuate brake shoes adapted to cooperate with the inner surface of the brake drum. In FIGURE 1, the reference character 10 indicates a brake drum that is mounted on the wheel hub (not shown) for rotation therewith. A stationary backing plate 11 is mounted on a stationary part of the vehicle (not shown).

In addition to the elements already described, the basic elements of the brake structure comprise a pair of brake shoes 12 and 13 in the form of arcuate segments, said brake shoes being provided with arcuate rim portions 14 and 15 supporting lining elements 16 and 17, respectively. The rim portions 14 and 15 are reinforced against flexure by web portions 18 and 19 extending perpendicularly therefrom.

The adjacent ends 20 and 21 of the brake shoes 12 and 13 engage an anchor pin device indicated generally by the reference character 22 fixed to the backing plate 11. The opposite ends 23 and 24 of the brake shoes 12 and 13 engage an adjusting strut 25, with the shoe ends 23 and 24 being retained in engagement with the adjusting strut by means of a tension spring 26.

A hydraulic wheel or brake cylinder 27 having plungers 28 and 29 extending from opposite ends thereof into engagement with the webs 18 and 19 provides the actuating device for moving the brake shoes 12 and 13 into engagement with the brake drum 10. The plunger members 28 and 29 extend from piston members (not shown) within the wheel cylinder 27, hydraulic fluid being delivered into the wheel cylinder between the piston members from a conventional brake pedal operated master cylinder (not shown). Retraction springs 30 and 31 normally urge the ends 20 and 21 of the brake shoes toward the anchor pin 22 when hydraulic pressure is released from the wheel cylinder 27.

The brake shoes 12 and 13 are resiliently urged laterally into engagement with the backing plate by spring assemblies 32 and 33 of conventional construction.

The anchor pin indicated generally by the reference character 22 consists of a pin-like or stud-like member having a circular or annular body portion 40, an annular shoulder or flange 41, and a reduced end portion 42. The reduced end portion 42 extends through an aperture 43 formed in the backing plate 11. In assembling this anchor pin device with the backing plate, a spacing washer 44 is interposed between the shoulder 41 and the backing plate 11 and preferably, although not necessarily, welded to the latter, as indicated at 45. After the anchor pin member has been assembled with the backing plate, the extremity of the reduced portion 42 is headed over to form a head 46 to secure the anchor pin device in place.

Formed preferably integrally with the wheel cylinder 27 is a boss or collar 47. This collar is adapted to surround the body portion 40 of the anchor pin structure to mount and secure the wheel or brake cylinder 27 thereto. The boss or collar 47 is secured onto the anchor pin by means of a washer 48 surrounding a reduced portion 49 adjacent the end of the anchor pin. A reduced headed portion 50 on the end of the anchor pin structure provides means for securing the ends of the retraction springs 30 and 31 which have the ends thereof hooked over the reduced headed portion 50, as shown in FIGURES 1 and 2. The adjacent ends of these retraction springs 30 and 31 serve to hold the washer 48 and the boss or collar 47 in place on the anchor pin structure.

As shown in FIGURE 1, the boss or collar 47 has a trapezoidal configuration and is substantially wedge shaped transversely or in front elevation, providing an anchor plate portion 47a having a pair of opposed sloping sides 51. The adjacent ends 52 of the brake shoe webs 18 and 19 are correspondingly shaped to be complementary to the sloping surfaces 51, so that the ends of the brake shoes may slide on the boss or collar 47 during the operation of the brake. Also, these complementary surfaces 51 and 52 provide an extended surface contact between the ends of the brake shoes and the anchor plate portion of the collar or boss 47.

The washer 48 is provided with extensions 48a which engage the brake shoe webs 18 and 19 to prevent displacement of the brake shoes laterally with respect to the backing plate 11.

The anchor pin structure is provided with a central bore having an enlarged portion 60 and a portion 61 of lesser diameter. A hydraulic fluid conduit 62 is provided with a nipple or fitting 63 threaded into the enlarged portion 60 of the bore. The reduced portion 61 of the bore is provided with a laterally-extending passage 64 which communicates with an annular groove 65 formed in the outer surface of the body portion 40. This annular groove 65 communicates with a passage 66 connected to the chamber 67 of the wheel or brake cylinder 27. Thus, in any rotative position of the anchor pin structure, communication is provided between the hydraulic fluid conduit 62 and the chamber 67 of the wheel cylinder 27.

The body 40, on opposite sides of the annular groove 65, is provided with grooves to receive packing members 68 which may preferably be in the form of O-rings. These O-rings not only provide a fluid-tight seal on both sides of the annular groove 65, but also provide a cushion between the boss or collar 47 and the body 40 of the anchor pin device. This cushion between these parts substantially eliminates or at least minimizes the noise resulting from the engagement of the ends of the brake shoes with the anchor pin, and thus serves to provide a quieter construction.

From the foregoing description, it will be evident that the wheel or brake cylinder 27 and the anchor pin structure 22 may be assembled with and secured to the backing plate 11 through the provision of only one aperture in the backing plate. In assembling the device, the anchor pin structure 22 is inserted in the aperture 43 in the backing plate and is riveted or headed over to provide the head 46 to rigidly secure the anchor pin structure to the backing plate. It will, of course, be understood that the spacing washer 44 has first been assembled and preferably welded to the backing plate. Thereafter, the boss or collar 47 of the wheel cylinder 27 is engaged with the body portion 40 of the anchor pin structure and secured in place by the washer 48 and the ends of the retraction springs 30 and 31. Thereafter, when the hydraulic fluid conduit 62 is attached by the nipple 63, the device is ready for operation. No special bleed outlet is necessary, because it is possible for the operator to bleed the system by partially disengaging the nipple 63 from the threaded aperture 60 of the anchor pin structure.

As stated heretofore, the O-rings 68 not only seal the annular groove 65, but provide a cushion between the collar 47 and the body of the anchor pin so as to substantially eliminate or minimize shoe slap noise. Moreover, the inclined surfaces 51 on the anchor plate portion 47a of the boss or collar 47 and the complementary inclined ends 52 on the ends of the brake shoes provide sliding bearing surfaces between these parts which facilitate the movement of the brake shoes during the operation of the brake.

Except for the aperture 43, the backing plate 11 may be kept imperforate. The cap screws, lock washers, and other attaching elements of the prior art are eliminated. The number of parts involved is reduced to a minimum so that the device may be manufactured economically and assembled quickly and easily.

While a commercially practical embodiment of the invention has been described and illustrated herein somewhat in detail, it will be understood that various changes may be made as may come within the purview of the accompanying claims.

What is claimed is:

1. A brake comprising a backing plate, a pair of brake shoes supported on said backing plate, an anchor pin device for said brake shoes extending through said backing plate and secured thereto, a wheel cylinder, a collar-like boss on said wheel cylinder surrounding one end of said anchor pin device for mounting said wheel cylinder thereon, means connecting the other end of said anchor pin device to a source of fluid pressure, a longitudinal bore in said anchor pin device communicating with said fluid pressure source, an annular groove in said anchor pin device, a lateral passage in said archor pin communicating at one end thereof with said bore and at the other end with said annular groove, and a passageway extending through a portion of said boss connecting said annular groove to the interior of the wheel cylinder.

2. A brake comprising a backing plate, a pair of brake shoes supported on said backing plate, an anchor pin device for said brake shoes extending through said backing plate and secured thereto, a wheel cylinder, a collar-like boss on said wheel cylinder surrounding one end of said anchor pin device for mounting said wheel cylinder thereon, means connecting the other end of said anchor pin device to a source of fluid pressure, a longitudinal bore in said anchor pin device communicating with said fluid pressure source, an annular groove in said anchor pin device having a lateral passage communicating with said bore, a passageway extending through a portion of said boss connecting said annular groove to the interior of the wheel cylinder, and annular packing and cushion members located in grooves in said anchor pin device on opposite sides of said annular groove to seal said annular groove and to provide a cushion between said boss and anchor pin device to minimize noise resulting from engagement of the brake shoes with said anchor pin device.

3. A brake comprising a backing plate, a pair of brake shoes supported on said backing plate, an anchor pin device for said brake shoes extending through said backing plate and secured thereto, a wheel cylinder, a collar-like boss on said wheel cylinder surrounding one end of said anchor pin device for mounting said wheel cylinder thereon, said boss being wedge shaped transversely to provide a pair of opposed sloping sides to engage the adjacent ends of the brake shoes, means connecting the other end of said anchor pin device to a source of fluid pressure, a longitudinal bore in said anchor pin device communicating with said fluid pressure source, an annular groove in said anchor pin device having a lateral passage communicating with said bore, and a passageway extending through a portion of said boss connecting said annular groove to the interior of the wheel cylinder.

4. A brake comprising a backing plate, a pair of brake shoes supported on said backing plate, an anchor pin device for said brake shoes extending through said backing plate and secured thereto, a wheel cylinder, a collar-like boss on said wheel cylinder surrounding one end of said anchor pin device for mounting said wheel cylinder thereon, said boss being substantially wedge shaped in vertical section to provide a pair of opposed sloping sides, the adjacent ends of the brake shoes being provided with complementary surfaces slidably engaging said sloping sides, means connecting the other end of said anchor pin device to a source of fluid pressure, a longitudinal bore in said anchor pin device communicating with said fluid pressure source, an annular groove in said anchor pin device having a lateral passage communicating with said bore, and a passageway extending through a portion of said boss connecting said annular groove to the interior of the wheel cylinder.

References Cited in the file of this patent

UNITED STATES PATENTS

| | | | |
|---|---|---|---|
| 1,633,136 | Shields | June 21, | 1927 |
| 2,064,688 | Rockwell | Dec. 15, | 1936 |
| 2,146,545 | Leighton | Feb. 7, | 1939 |
| 2,213,383 | Canfield | Sept. 3, | 1940 |
| 2,372,415 | Eksergian | Mar. 27, | 1945 |
| 2,711,229 | Thorne | June 21, | 1955 |
| 2,755,889 | Schnell | July 24, | 1956 |
| 2,833,378 | Main | May 6, | 1958 |
| 2,867,297 | White | Jan. 6, | 1959 |
| 2,885,035 | Rubly | May 5, | 1959 |
| 2,902,118 | Parker | Sept. 1, | 1959 |
| 3,016,112 | Helvern | Jan. 9, | 1962 |